Dec. 19, 1967   M. L. DOWNS   3,358,378
METHOD AND APPARATUS FOR MEASUREMENT OF MOISTURE
Filed April 19, 1965
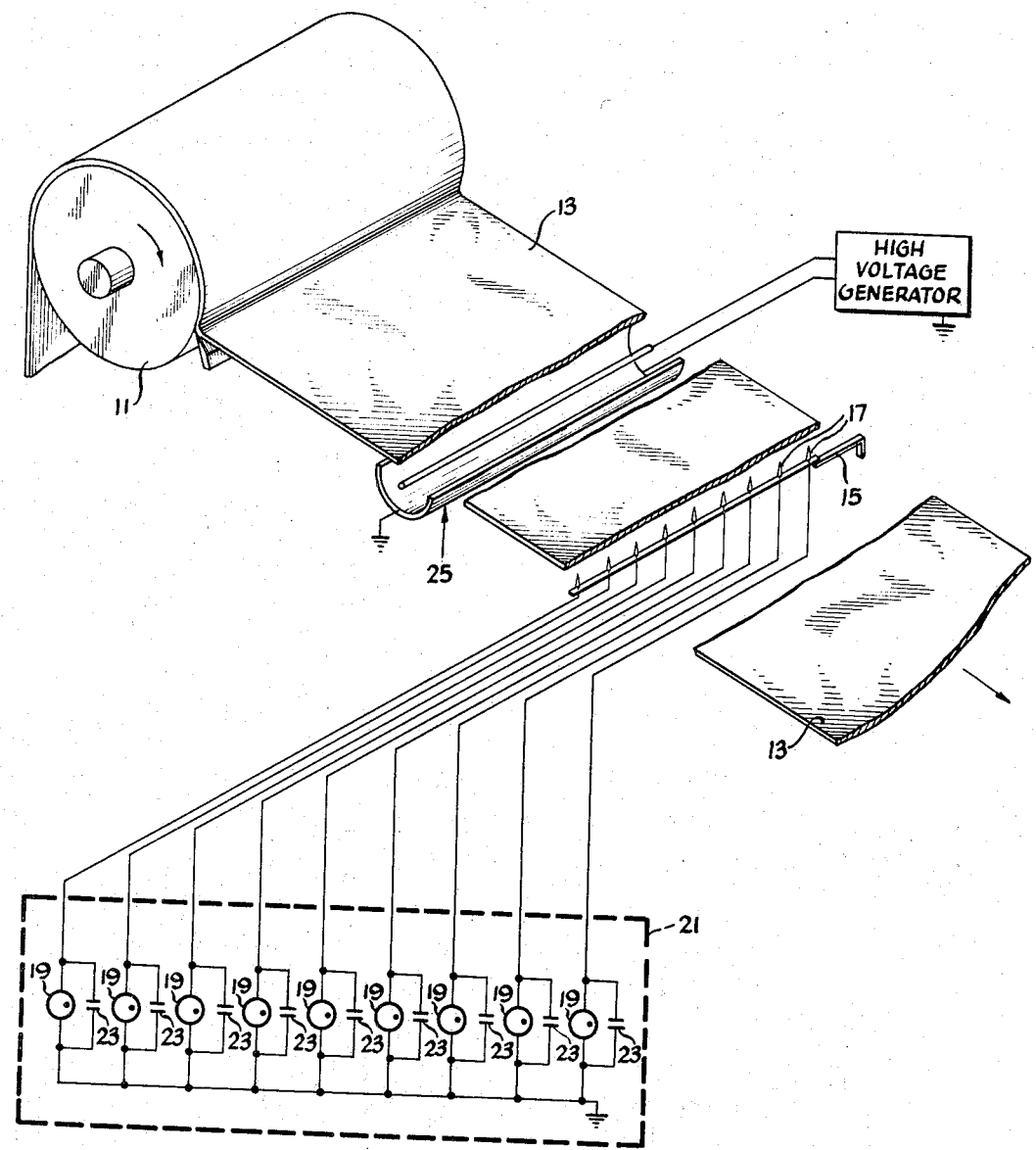
Inventor
Martin L. Downs 3,358,378
METHOD AND APPARATUS FOR MEASUREMENT OF MOISTURE
Martin L. Downs, Grand Chute, Wis., assignor to Thilmany Pulp & Paper Company, Kaukauna, Wis., a corporation of Wisconsin
Filed Apr. 19, 1965, Ser. No. 448,937
10 Claims. (Cl. 34—1)

This invention relates to measurement of moisture content, and more particularly to the measurement of moisture content in a moving web of paper.

Accurate determination of moisture content is of considerable interest to the paper industry wherein various drying processes are employed to arrive at desired moisture levels for the paper products produced. To measure the moisture profile of a moving web of paper exiting from a drying apparatus, various measuring units have been used which mechanically traverse the moving web in successive steps to provide a composite profile across the web. Such units variously measure the conductance, capacitance, or resistance of the web or sheet of paper in an electrical circuit. Apparatus which employ nuclear energy for measuring purposes are also available. Measurement of moisture content in this manner is expensive, and less expensive apparatus is desired. Moreover, fairly sophisticated electrical measurements, such as these, are often affected by the unit weight of the web, the bulk of the web, the precise position of the measuring instruments relative to the traveling web, requiring considerable precision in operation.

Furthermore, when a measuring unit is used which has a single measuring head, it is not possible to obtain a simultaneous reading completely across the web. Instead, the actual line of measurement on the web is usually a diagonal line, the length of which is determined by the speed at which the head traverses the web relative to the forward speed of the web.

It is a principal object of the present invention to provide an improved method for measuring the moisture content of a moving web of paper and apparatus for performing the same. It is another object to provide a method for simultaneously measuring the moisture content profile entirely across a moving web of paper and to provide inexpensive apparatus for performing the same. It is a further object to provide a method for measuring the relative moisture content of a moving web of paper which method is independent of the weight and bulk of the web and to provide apparatus for performing the same. It is a still further object to provide apparatus for measuring the relative moisture content of a moving web of paper which apparatus is susceptible to inexpensive construction and is visibly readable. Still another object is to provide a method for uniformly drying a web of paper using drying apparatus the effectiveness of which is adjustable across the width of the web. These and other objects of the invention are more particularly set forth in the following detailed description and in the accompanying drawing wherein there is illustrated a diagrammatic view of apparatus embodying various of the features of the invention, which apparatus is described in the example.

It has been found that variation in moisture content from point to point across a moving web of paper can be accurately determined by measuring the electrostatic charge carried by the moving web. Apparatus for the measurement of the electrostatic charge at fairly closely spaced points in a line transverse the direction of movement of a moving web of paper can be simply and inexpensively constructed and operated.

It has been found that the simultaneous measurement of electrostatic charge at a series of spaced points across a web of paper provides an accurate indication of the relative moisture content across the moving web. If the entire web or sheet has approximately the same moisture content, the electrostatic charge at each of the points at which the measurements are made is about equal; thus, similar indications are produced by the measuring devices. If, for instance, one area of the web of paper has a substantially lower moisture content than the remainder of the web, this area carries a higher electrostatic charge and thus produces an indication of relatively greater magnitude at the associated measuring points. Conversely, if one area of the web of paper is wetter than the remainder of the web, the electrostatic charge at this area is correspondingly lower and is reflected by indications of proportionally lesser magnitude at the measuring points associated with this area.

Depending upon the prior treatment which the web of paper has undergone and the general moisture level of the web, the web may not carry a sufficient electrostatic charge to permit measurement in this manner. When a moving web is passed through a calender stack, i.e., a plurality of calender rolls, after the completion of its drying operation, it usually builds up a sufficient electrostatic charge so that areas of the web having a moisture content of about 5% (of total weight of the web) or less are easily detected when measured in the contemplated manner. If the electrostatic charge carried by the web of paper is below the minimum charge desirable for measurement, about 10,000 volts, an electrostatic charge can be generated by an electrostatic generator and imposed uniformly across the web. Operation in this manner is effective to assure that the electrostatic charge carried by the moving web exceeds the minimum desirable level regardless of the daily atmospheric conditions, which affect the generation of electrostatic charges.

As stated above, the frictional co-action between the dried paper and the rolls of a calender stack is usually more than adequate to build up an easily measurable electrostatic charge so an electrostatic generator is unnecessary if measurement is carried out after the web has passed the calender stack. If it is desired to measure the web immediately upon its exit from the last dryer, an electrostatic generator is usually employed.

Any suitable method for measuring the electrostatic charge upon the moving web of paper may be utilized. Apparatus may be used wherein the magnitude of the electrostatic charge is measured via electrostatic induction. In such instances, electrodes may be employed adjacent the moving web which have plate-like terminal portions to assure a charge of desired magnitude is induced. The measuring indicators used with such a system might be any of the various electroscope types which have been developed.

Instead of measuring the electrostatic charge by electrostatic induction, the charge may also be measured by causing discharge to occur between the surface of the moving web and an electrode connected to ground and measuring the discharge. This discharge method of measuring is preferred. In this method, pointed electrodes are preferably used in order to increase the amount of charge per unit area.

Suitable indicators are used to measure the discharge between the point of the electrode and the web. Visual indicators are preferred and can be simply installed by connecting a low resistance neon lamp or tube between the electrode and ground. The specific resistance of the lamp employed is such that the contemplated electrostatic charge breaks down the lamp and the magnitude of glow of the lamp is indicative of the relative moisture content of the localized area of the moving web. The less moisture a localized area of paper has, the greater an electrostatic charge it carries, and the more intensely the associated neon lamp glows. A plurality of these lamp-electrode combinations can be inexpensively spaced at intervals across the entire width of the web to indicate the moisture profile.

Rather than using the continuous glow of a lamp as the measuring indicator, cyclic discharges of a lamp can alternately be easily produced. A condenser, of suitable capacitance, is wired in parlalel with each of the neon gas lamps to produce a system sometimes referred to as a gas tube relaxation oscillator. In such a circuit, a resistor may also be wired in series with each parallel combination of condenser and neon lamp. However, at the fairly high electrostatic voltages usually obtained in the papermaking operations, additional resistance is usually not required because the actual resistance of the circuit suffices. In this type circuit, the relative magnitude of the charge on the localized area of the moving web of paper is determined by the frequency at which the condenser builds up the charge and then discharges through the lamp, causing the lamp to flash or blink. It is often easier to distinguish small differences in the frequencies at which lamps are blinking rather than small differences in the relative intensities of glow in lamps.

In addition to these relatively simple methods of measuring the electrostatic charge by visual indicators, many more sophisticated indicators may be employed. For example, the bled-off charge can be fed into an electrometer of the quadrant variety. Electrostatic voltmeters may also be used. Equipment such as this is well suited for calibration and may be used to measure absolute moisture content, in addition to relative moisture content. These methods of measurement may also be used to produce numerical read-out which can be recorded for permanent records, if desired.

The oscillations produced by the gas tube relaxation oscillator, previously described, may also be fed into various types of electronic units, as for example those designed to read-out using digital read-out equipment. Moreover, the read-out signals from sophisticated equipment such as this can be fed to control units connected to the drying apparatus. In this manner, corrections can be immediately and automatically made to counteract any variances from the desired moisture content that occur in areas in the web.

The distance at which the terminals of the electrodes are spaced from the moving web of paper depends, in part, upon the particular web of which the moisture content is being measured. If the web has a rather high propensity to build up an electrostatic charge, the electrodes need not be spaced close to the surface of the web. The spacing intervals between adjacent electrodes across the web are also to be taken into consideration. For example, if the electrodes are spaced at 2-inch intervals across the web, to avoid overlapping readings at the terminals of the electrodes, it is preferred to space the electrodes not more than 2 inches from the web. In papermaking, a rather high electrostatic charge usually builds up on the web, so there is no problem in spacing the terminals of the electrodes an inch or two from the web of paper.

Although the method of the invention is susceptible to incorporation into relatively sophisticated equipment which might automatically maintain the absolute moisture content of a moving web of paper at a certain value entirely across the web, it is considered particularly valuable because it may be used to produce visual read-out. By employing visual indicators and circuitry which produces either varying intensities of glow or varying pulse rates when there is a difference in relative moisture content across a moving web, apparatus which is both inexpensive and simple in design and operation can be provided. Such apparatus immediately indicates to the operator of a papermaking machine when there is any substantial variance in the relative moisture content of any area transverse the width of the paper web. In a system of this type that is concerned only with the relative moisture content, the sophisticated instrumentation necessary to provide numerical measure of absolute moisture content is not needed. By watching the visual indicators, a papermaking machine operator is warned whenever the moisture content of an area of the web changes substantially so that he may immediately take the necessary steps to adjust the drying apparatus to correct for this difference.

One of the major advantages of the invention lies in the fact that a plurality of individual electrode-indicator combinations can be placed at close intervals directly across the entire width of the web without incurring large expense. Accordingly, it is possible to provide simultaneous read-out in a line across the entire width of the moving web. This is important in a method of operation wherein the relative, and not the absolute, moisture content of the web is being measured. The most meaningful readings are provided when measurement is made simultaneously at points in a line perpendicular to the direction of movement of the web because this line in the paper gives the most representative profile of the entire sheet.

The following example is illustrative of a method and apparatus embodying various features of the invention.

*Example*

As depicted in the drawing, apparatus for measuring the relative moisture content of a continuous web from a papermaking machine is located at a point just after the final dryer. As shown, final drying is carried out on a Yankee dryer 11 which is a large cylindrical dryer wherein the heat is adjustable over lateral bands of its surface. The web of paper 13 from the dryer is carried to various trimming and slitting apparatus (not shown).

A grounded support frame 15 extending below and adjacent to the moving web 13 is located in line after the dryer 11. The frame 15 supports a plurality of pointed electrodes 17, each of which is positioned in a line perpendicular to the direction of movement of the web with its point about 1 inch from the lower surface of the moving web of paper. Each of the electrodes 17 terminates in a sharp point to facilitate discharge of the electrostatic charge between the web 13 and the electrodes 17. Connected to each of the electrodes 17 is a small neon lamp 19 for example a GE series NR-51B. The lamps 19 are mounted atop a control panel 21 located adjacent the path of the web. Wired in parallel with each of the neon lamps 19 is a 0.25 microfarad condenser 23.

An electrostatic generator 25 is provided at a location between the dried 11 and the discharge electrodes 17. The electrostatic generator 25 is operated to deposit an electrostatic charge of about 10,000 volts upon the lower surface of the moving web 13.

The web of paper has a width of about 150 inches and moves past the frame 15 at a rate of about 15 feet per second. There are 16 combinations of electrodes and indicators spaced across the web at 10 inch intervals in a line perpendicular to the direction of movement of the web. Depending upon the atmospheric conditions and the approximate moisture content of the paper web 13, the neon lamps fire at intervals from about every ¼ second to about every 10 seconds. If a faster firing frequency is desired, 0.02 microfarad capacitors are substituted for the 0.25 microfarad capacitors.

The firing rate pattern gives a visual profile of the relative moisture content of the moving paper web 13. If a dry streak develops in a paper so that the moisture content of the streak is about 5% or less, this area of the paper with the low moisture content carries a higher electrostatic charge. As a result of the higher charge, the neon lamps 19 connected to the electrodes 17 adjacent this streak begin to fire more rapidly than do the other lamps. The change in firing rate is immediately noticeable to the machine operator, and by observing how many of the lamps on the control panel 21 are firing at an increased rate, the operator is appraised of the approximate width of the dry streak. The operator is then able to make the necessary adjustment in the drier 11 to correct this deviation. When all of the lamps 19 are again firing at about the same rate, the operator is assured that the adjustments, which he made had the desired result.

Thus, the invention provides a simple, yet extremely versatile, method for measuring the relative moisture content of a moving web of paper and is especially suitable to quickly detect dry streaks that may develop. In addition to its versatility, one of the major advantages of the invention is that very inexpensive apparatus provides extremely reliable results. Moreover, the simplicity of the apparatus insures trouble-free operation thereof.

Although the invention has been described with respect to various embodiments, it should be realized that these in no way constitute limitations upon the invention and that improvements and modifications, as would be obvious to a person having the ordinary skill of the art, are within the scope of the invention which is defined only by the appended claims.

Various of the features of the invention are set forth in the following claims.

What is claimed is:

1. In a method of measuring the moisture content of a moving web of paper, the steps comprising simultaneously collecting the electrostatic charge from the web of paper at a plurality of points spaced generally transversely across the web, transmitting the charges collected at each point to an indicator, and converting the transmitted charges to a plurality of signals indicative of the relative moisture content of the web.

2. In a method of measuring the moisture content of a moving web of paper, the steps comprising depositing an electrostatic charge across a surface of the moving web and at a location after the web has advanced from the point of deposition of the electrostatic charge simultaneously collecting the electrostatic charge from the web of paper at a plurality of points spaced generally transversely across the web, transmitting the charges collected at each point to an indicator, and converting the transmitted charges to a plurality of signals indicative of the relative moisture content of the web.

3. In a method of measuring the moisture content of a moving web of paper, the steps comprising drying a moving web of paper to a desired moisture content and simultaneously collecting the electrostatic charge from the web of paper at a plurality of points spaced generally transversely across the web, transmitting the charges collected at each point to an indicator, and converting the transmitted charges to a plurality of signals indicative of the relative moisture content of the web, whereby areas of the moving web which have a moisture content of about 5% or less are readily detected.

4. In a method of measuring the moisture content of a moving web of paper, the steps comprising drying a moving web of paper to a desired moisture content, depositing an electrostatic charge across a surface of the moving web and, at a location after the web has advanced from the point of deposition of the electrostatic charge, simultaneously collecting the electrostatic charge from the web of paper at a plurality of points spaced generally transversely across the web, transmitting the charges collected at each point to an indicator, and converting the transmitted charges to a plurality of signals indicative of the relative moisture content of the web whereby areas of the moving web which have a moisture content of about 5% or less are readily detected.

5. A method of measuring the relative moisture content across a moving web of paper, the steps comprising drying a moving web of paper to a desired moisture content, passing said dried web through a plurality of calender rolls whereby an electrostatic charge accumulates upon said moving web and, at a plurality of points along said surface of the web which points are spaced in a line generally transverse to the direction of movement of the web, simultaneously discharging the electrostatic charge on the web through a plurality of visual indicating means each of which is associated with one of said discharge points whereby the magnitude of visual indication varies proportionately with the magnitude of the electrostatic charge on said web adjacent the associated point of discharge and areas of the moving web which have a moisture content of about 5% or less are readily detected.

6. A method of measuring the relative moisture content across a moving web of paper, the steps comprising drying a moving web of paper to a desired moisture content, treating the moving web in a manner so that an electrostatic charge of at least about 10,000 volts accumulates upon said moving web and, at a plurality of points along said surface of the web which points are spaced in a line generally transverse to the direction of movement of the web, simultaneously discharging the electrostatic charge on the web through a plurality of visual indicating means each of which is associated with one of said discharge points to cause a pulsating visual indicating whereby the frequency of indication varies proportionately to the magnitude of the electrostatic charge on said web adjacent the associated point of discharge and areas of the moving web which have a moisture content of about 5% or less are readily detected.

7. In a method of making paper, the steps comprising drying a web of paper to a desired moisture content, treating the moving web so that an electrostatic charge of at least about 10,000 volts accumulates thereupon, measuring the relative moisture profile of the web by simultaneously measuring the electrostatic charge on the web at a plurality of points along a surface thereof which points are spaced generally transversely across the web, said measuring being made using indicators which produce visual signals that vary according to magnitude of electrostatic charge, visually comparing the signals of the indicators to determine whether an area of the web has a moisture content significantly different than other areas, and appropriately adjusting said drying to so alter the moisture content of any area which may be out of line with the rest of the web to bring that area into correspondence.

8. Apparatus for measuring the relative moisture content of an electrostatically charged moving web, which apparatus comprises a plurality of electrodes, means for mounting said electrodes at spaced intervals and insulated from one another in a line generally transverse to the direction of movement of the web and sufficient close to the surface of the web to cause discharge of an electrostatic charge between the moving web and the electrodes, a plurality of visual lamp indicators, and means electrically connecting one of said visual lamp indicators to each of said electrodes and to ground, said indicators including means for producing visual signals which are representative of the magnitude of the electrostatic discharge between the associated electrode and the adjacent area of the web, whereby visual comparison of the signals of said indicators points out whether any area of the web has a moisture content significantly different than other areas thereof.

9. Apparatus for measuring the relative moisture profile of an electrostatically charged moving web, which apparatus comprises a plurality of electrodes, means for mounting said electrodes at spaced intervals in a line generally transverse to the direction of movement of the web and sufficiently close to the surface of the web to cause discharge of an electrostatic charge between the moving web and the electrodes, a plurality of gas-lamp indicators, a plurality of condensers, and means electrically connecting one of said condensers in parallel with each one of said indicators and connecting one of said condenser-indicator combinations between each of said electrodes and ground, whereby said gas-lamp indicators flash at a rate which is representative of the magnitude of the electrostatic discharge between the associated electrode and the adjacent areas of the web, so that comparison of the flashing gas-lamp indicators points out whether any area of the web has a moisture content significantly different than other areas thereof.

10. Apparatus for measuring the relative moisture profile of an electrostatically charged moving web, which apparatus comprises means for generating an electrostatic charge and imposing the charge upon the moving web, a plurality of electrodes, means for mounting said electrodes at spaced intervals in a line generally transverse to the direction of movement of the web and sufficiently close to the surface of the web to cause discharge of an electrostatic charge between the moving web and the electrodes, said mounting means being located where said line of electrodes is spaced from said charge-generating means in the direction of movement of the moving web, a plurality of gas-lamp indicators, a plurality of condensers, and means electrically connecting one of said condensers in parallel with each one of said indicators and connecting one of said condenser-indicator combinations between each of said electrodes and ground, whereby said gas-lamp indicators flash at a rate which is representative of the magnitude of the electrostatic discharge between the associated electrode and the adjacent area of the web, so that comparison of the flashing gas-lamp indicators points out whether any area of the web has a moisture content significantly different than other areas thereof.

References Cited
UNITED STATES PATENTS

| | | | |
|---|---|---|---|
| 2,189,352 | 2/1940 | Siegenheim | 324—32 |
| 2,532,010 | 11/1950 | Courvoisier | 73—73 X |
| 2,760,105 | 8/1956 | Michaels | 324—72 X |
| 2,849,676 | 8/1958 | Collins | 324—32 |

FREDERICK L. MATTESON, Jr., *Primary Examiner.*

JOHN J. CAMBY, *Examiner.*